T. B. NODEN.
ADJUSTABLE CONNECTOR FOR ANTISKID CHAINS, &c.
APPLICATION FILED DEC. 13, 1915.
1,182,198. Patented May 9, 1916.
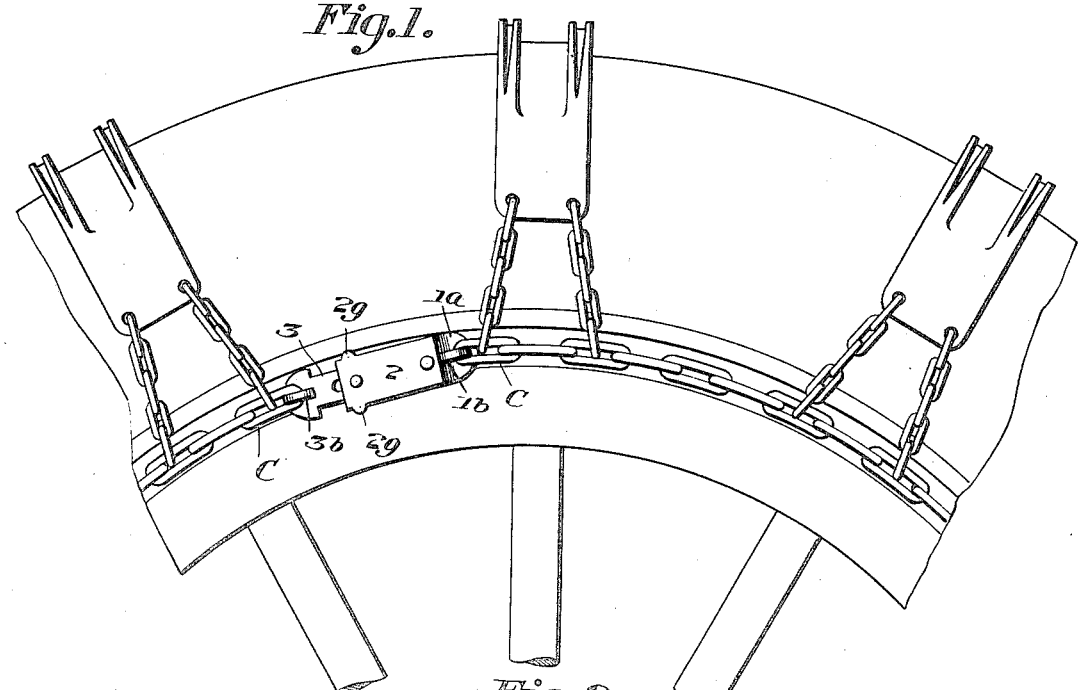
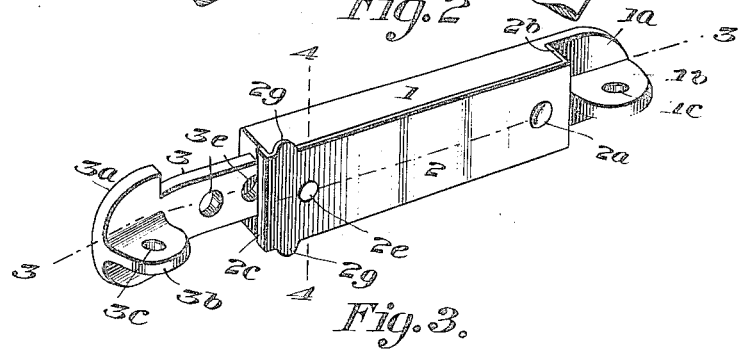
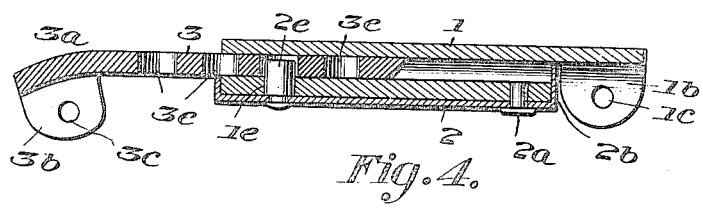
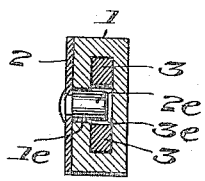
Witnesses
Philip E. Barnes
G. K. Keifer
Inventor
Thomas B. Noden
By Alexander & Sowell
Attorneys

UNITED STATES PATENT OFFICE.

THOMAS B. NODEN, OF MOLINE, ILLINOIS.

ADJUSTABLE CONNECTOR FOR ANTISKID-CHAINS, &c.

1,182,198.  Specification of Letters Patent.  Patented May 9, 1916.

Application filed December 13, 1915. Serial No. 66,580.

*To all whom it may concern:*

Be it known that I, THOMAS B. NODEN, a citizen of the United States, residing at Moline, in the county of Rock Island and State of Illinois, have invented certain new and useful Improvements in Adjustable Connectors for Antiskid-Chains, &c.; and I hereby declare that the following is a full, clear, and exact description thereof, reference being had to the accompanying drawings, which form part of this specification.

This invention is a novel connector for detachably fastening automobile anti-skid devices to wheels; and the object of this invention is to enable the ends of the fastening chains of such anti-skid devices to be readily connected together, and to provide a connecting device by which slack in the chain can be taken up.

The invention provides a fastener which is strong and adjustable, and can be easily applied, and as easily detached, by a person; but will not be detached by blows from exterior objects, or by the shocks and jars incident to the travel of the wheel over rough roadways.

My novel connector is especially designed for coupling together non-skid automobile chains, but might be used for other purposes where an adjustable connection is desired.

I will explain the invention in connection with the accompanying drawings, in which—

Figure 1 is a perspective view of the connector as used to connect non-skid chains; Fig. 2 is an enlarged perspective view of the connector detached; Fig. 3 is a longitudinal section on line 3—3 Fig. 2; Fig. 4 is a transverse section on line 4—4 Fig. 2.

The connector, as shown in said drawings, comprises a main body portion 1 preferably made of steel or annealed iron; said body being an oblong and rectangular in plan, preferably flat, wider than it is high, and about three times as long as it is wide. Said body has at one end a shank portion $1^a$ extending from its bottom, and provided with an upstanding ear $1^b$ perforated as at $1^c$ for the engagement of a link of the chain C of the anti-skid chain or other devices which the connector is to fasten. This body 1 is provided with an opening or socket extending from the front end of the body toward the shank; said socket being preferably rectangular in cross section and conforming approximately in form to the cross section of the body 1. Attached to said body is a spring plate 2, which preferably covers one of the wide flat surfaces of the body, and is fastened at one end to the body, preferably by means of a rivet $2^a$ near the shank $1^a$ as shown. The rear end of this plate 2 is preferably bent downwardly, as at $2^b$, against the rear end of the body, and its forward end is also preferably bent downwardly over the front edge of the body, above the socket, as indicated at $2^c$. The downturned ends of the plate will prevent anything catching or entering between the ends of the said plate and the body. To said spring plate near its front end is attached a catch bolt or pin $2^e$, which passes through a corresponding opening $1^e$ in the side of the body 1 adjacent the front end thereof, and is adapted to engage any one of a series of openings $3^e$ in an adjustable slide which telescopes within the body 1. Said slide has a body portion 3, which corresponds in cross section to the socket in the body 1, and is adapted to fit easily but securely therein; and in said body portion is the series of openings $3^e$ that extend longitudinally thereof. By moving the slide in the body any one of said openings can be engaged with the catch $2^e$.

The slide has a head $3^a$ on its outer end approximately corresponding in form to the shank portion $1^a$ of the body, and provided with an ear $3^b$ having a perforation $3^c$ for engagement with a link $C'$ of the chain of the anti-skid or other device to be fastened.

The front end of the spring plate 2 may be raised, so as to disengage the catch $2^e$ from the slide 3, and then the latter can be adjusted in or out of the body 1. For convenience plate 2 may be provided, near its front end, with lateral ears $2^g$ which may project slightly beyond the sides of the body, so that they can be readily engaged by the thumb or fingers of the person desiring to disengage the catch $2^e$ from the slide 3.

In using the connector, the part 1 is attached to one end C of the chain or member to be connected; and the slide 3 to the other end $C'$ of such chain or member. When used for connecting the fastenings of anti-skid devices for automobile wheels, after such anti-skid devices are in place the slide 3 is entered more or less into the body 1 according to the amount of slack in the chain, and is securely fastened thereto by engagement with the catch $2^e$ on the spring plate 2. The pull on this catch is transferred directly to the body 1. If after the connector is applied, slack should develop in the chain, the slide can be pushed farther into the body and take up the slack.

When the connector is applied, exterior pressure on the body only tends to hold the catch pin more securely in place. As the spring plate lies flat against the body, and is protected at both ends, it is not liable to be disengaged by striking any exterior objects, and any inward pressure on this plate simply tends to lock the slide more securely.

My connector is absolutely proof against being unfastened by striking any exterior objects because all the operative parts are entirely protected, and the spring plate has to be pushed outwardly to cause the pin to disengage the slide, and the strain of pull on the slide is taken care of by the catch, there being no pulling strain upon the spring plate.

When it is desired to disengage the connector the spring plate can be forcibly raised by the fingers until the catch disengages the slide, and then the latter can be quickly released.

What I claim is:

1. A connector for the purpose described comprising a body having a longitudinal socket and provided at one end with a shank for engagement with one of the members to be connected, a catch plate fitted on one exterior side of the body and secured thereto at one end, the free end of said spring plate being bent downwardly over the end of the body opposite the shank to prevent the free end of the plate catching on obstructions; a catch attached to said plate near the outer end of the body and projecting into the body through an adjacent opening therein; and a slide telescoping said body and fitting the socket therein and provided with a series of holes adapted to be engaged by the inner end of said catch, said slide having a head on its outer end for engagement with the other member to be connected.

2. A connector for the purpose described comprising a body having a longitudinal socket provided at one end with a perforated shank for engagement with one of the members to be connected, a spring plate fitted to one side of the body and secured thereto at one end, a catch attached to said plate near the outer end of the body and projecting into the body through an adjacent opening in the side of the body, said spring plate being bent downwardly over the end of the body opposite the shank to prevent the free end of the plate catching on obstructions, and said plate being also provided with laterally projecting ears adjacent the catch whereby said plate may be raised to disengage the catch from the opening in the slide; a slide having a shank telescoping said body and fitting the socket therein, and provided with a series of holes adapted to be engaged by said catch; said slide having a head on its outer end provided with an eye for engagement with the other member to be connected.

In testimony that I claim the foregoing as my own, I affix my signature.

THOMAS B. NODEN.